US008631232B2

(12) United States Patent
Xiao et al.

(10) Patent No.: US 8,631,232 B2
(45) Date of Patent: Jan. 14, 2014

(54) WIRELESS PERSONAL AREA NETWORK ACCESSING METHOD

(75) Inventors: Yuelei Xiao, Shaanxi (CN); Jun Cao, Shaanxi (CN); Xiaolong Lai, Shaanxi (CN); Zhenhai Huang, Shaanxi (CN); Bianling Zhang, Shaanxi (CN); Zhiqiang Qin, Shaanxi (CN); Qizhu Song, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 413 days.

(21) Appl. No.: 12/863,272

(22) PCT Filed: Jan. 14, 2009

(86) PCT No.: PCT/CN2009/070138
§ 371 (c)(1),
(2), (4) Date: Jul. 16, 2010

(87) PCT Pub. No.: WO2009/092315
PCT Pub. Date: Jul. 30, 2009

(65) Prior Publication Data
US 2011/0055554 A1    Mar. 3, 2011

(30) Foreign Application Priority Data
Jan. 18, 2008 (CN) .......................... 2008 1 0017345

(51) Int. Cl.
*H04L 29/00* (2006.01)
(52) U.S. Cl.
USPC ....................................................... 713/155
(58) Field of Classification Search
USPC ....................................................... 713/155
See application file for complete search history.

(56) References Cited

U.S. PATENT DOCUMENTS

| 7,239,864 B2 | 7/2007 | Zhang |
| 7,275,157 B2 | 9/2007 | Cam Winget |
| 2004/0240412 A1 | 12/2004 | Winget |

(Continued)

FOREIGN PATENT DOCUMENTS

| CN | 1455556 A | 11/2003 |
| CN | 1685694 A | 10/2005 |

(Continued)

OTHER PUBLICATIONS

Korean Notice of Allowance regarding Application No. 10-2010-7018127, dated Sep. 22, 2011. Translation provided by Unitalen Attorneys At Law.

(Continued)

*Primary Examiner* — Michael S McNally
(74) *Attorney, Agent, or Firm* — Harness, Dickey & Pierce, P.L.C.

(57) ABSTRACT

A wireless personal area network accessing method is provided, the method includes that: a coordinator broadcasts a beacon frame, the beacon frame includes the information about whether the coordinator sends an authentication requirement, the beacon frame also includes the authentication supported by the coordinator and key management package when a device receipts the authentication requirement, the device receives the beacon frame, the authentication between the coordinator and the device is made by using a authentication method corresponding to the authentication supported by the coordinator and key management package, when the device determines that the coordinator and the device is directly made according to the authentication result, or the association between the coordinator and the device is made after making session key negotiation.

9 Claims, 2 Drawing Sheets

(56) References Cited

U.S. PATENT DOCUMENTS

| | | |
|---|---|---|
| 2005/0265371 A1 | 12/2005 | Sharma et al. |
| 2006/0039340 A1* | 2/2006 | Ptasinski et al. ............ 370/338 |
| 2006/0041749 A1* | 2/2006 | Ptasinki et al. ............ 713/168 |
| 2006/0041750 A1* | 2/2006 | Carter et al. ............ 713/168 |
| 2006/0161771 A1 | 7/2006 | Zhang |
| 2006/0270438 A1 | 11/2006 | Choi |
| 2007/0104138 A1* | 5/2007 | Rudolf et al. ............ 370/329 |
| 2007/0162751 A1 | 7/2007 | Braskich et al. |
| 2007/0190973 A1* | 8/2007 | Goto et al. ............ 455/410 |
| 2007/0226499 A1 | 9/2007 | Zhang |
| 2007/0280169 A1 | 12/2007 | Cam Winget |
| 2008/0118069 A1* | 5/2008 | Yang ............ 380/279 |
| 2011/0029776 A1 | 2/2011 | Xiao et al. |

FOREIGN PATENT DOCUMENTS

| | | |
|---|---|---|
| CN | 1705245 A | 12/2005 |
| CN | 1836404 A | 9/2006 |
| CN | 101010913 A | 8/2007 |
| CN | 101080883 A | 11/2007 |
| CN | 101227362 A | 7/2008 |
| CN | 101232419 A | 7/2008 |
| EP | 1523129 A2 | 4/2005 |
| KR | 100593944 B1 | 6/2006 |
| KR | 20070052772 A | 5/2007 |
| KR | 20070071583 A | 7/2007 |
| WO | WO-2004107780 A2 | 12/2004 |
| WO | WO-2004114612 A2 | 12/2004 |

OTHER PUBLICATIONS

Zhejiang University Master Thesis. Research of Wireless Sensor Network Construction Based on IEEE802.15.4. Ouyang, Feng. Feb. 2006. Abstract provided by Unitalen Attorneys at Law.

IEEE P802.11 Wireless LANs. Efficient Mesh Security and Link Establishment. Nov. 2006.

IEEE Std. 802.1—2007 (Revision of IEEE Std. 802.11-1999). IEEE Standard for Information Technology—Telecommunications and information exchange between systems—Local and metropolitan networks—Specific requirements. Part 11: Wireless LAN Medium Access Control (MAC) and Physical Layer (PHY) Specifications. Sponsor LAN/MAN Committee of the IEEE Computer Society. Approved Mar. 8, 2007. Published Jun. 12, 2007.

Extended European Search Report regarding Application No. 09704782.3-2413/ 2234438, dated Nov. 20, 2012.

* cited by examiner

WIRELESS PERSONAL AREA NETWORK ACCESSING METHOD

This application claims priority to Chinese Patent Application no. 200810017345.2, filed with the Chinese Patent Office on Jan. 18, 2008 and entitled "Wireless personal area network access method", which is hereby incorporated by reference in its entirety.

FIELD OF THE INVENTION

The present invention relates to a wireless network access method and in particular to a wireless personal area network access method.

BACKGROUND OF THE INVENTION

In recent years, the development of wireless mobile communications has been changing continuously, and new technologies, e.g., the 3G in cellular communication, Local Multipoint Distribution Services (LMDS) and Microwave Multipoint Distribution Systems (MMDS) in a broadband wireless access, the Authentication and Privacy Infrastructure of a Wireless Local Area Network (WLAN) and the IEEE 802.11b, 802.11a, 802.11g, have been emerging constantly to make the world seem smaller and smaller due to the huge wireless network. New concepts and products of network terminals, human oriented, personalized and intelligent mobile computing, a convenient and rapid wireless access, wireless interconnecting, etc., spreading all over the world have stepped gradually into business and daily life of people. Various portable consumer electronic products, e.g., mobile phones, Personal Digital Assistants (PDA), notebook computers, digital cameras, etc., have increasingly become part of daily life of people. With an increasing number of these peripheral devices, one of focuses to which people have paid attention is how to share a variety of devices and their information easily and inexpensively within limited and varying office and household environments in a small scope. A Wireless Personal Area Network (WPAN) is an emerging wireless communication network technology to address a small radius of activity, abundant types of services, a specific group oriented and implementation of wireless and seamless connection.

The WPAN is a wireless network comparable to but smaller in coverage than a wide area network and a local area network and currently has become one of crucial components in a communication network, and also it acts as a predominant technology of 4G wireless communication and control and is capable of seamless connection to various air interfaces of 2G and 3G mobile communication. It provides seamless connection which provides abundant types of services and is oriented to a specific group in a Personal Operating Space (POS). The POS refers to only a small coverage space around a person and with a typical range of 10 m in which communication occurs in an Ad Hoc manner. The POS is limited to only the person, particularly a device held by the person, and moves with the moving user. The WPAN enables devices in the POS to communicate but also allows these devices to communicate with other devices entering the POS. The WPAN can come into being spontaneously as needed for the user without further intervention from the user and interoperate with a deployed or separate network. The WPAN can also enable an authenticated and secured operation mode by allowing rapid connection to a permitted personal device while rejecting connection to another non-permitted device. The WPAN is largely intended to provide a personal user with services of convenient and rapid data transmission between consumer electronic devices, etc.

A device has to be connected to a coordinator in the WPAN for an access to the WPAN. The coordinator in the WPAN refers to a means capable of accessing the device to the WPAN and performing a routing function for the device, and typically the coordinator per se also performs some terminal functions. At present, there are three general WPAN access methods particularly as follows:

In a first access method, the device has an access to the WPAN and acquires a network address in an insecure mode and then communicates with another device in the WPAN or after acquiring a secure service key from the WPAN, the device communicates securely with another device in the WPAN.

In a second access method, the device operates securely on an association process using a pre-shared session key, and if the coordinator can perform a de-securing operation successfully, then the coordinator enables an access of the device to the WPAN so that the device has an access to the WPAN and acquires a network address in a secure mode.

In a third access method, the device has an access to the WPAN and acquires a network address in an insecure mode and then is subject to authentication with the WPAN administrator, and if authentication is passed, then an access of the device to the WPAN is enabled; otherwise, the device is removed from the WPAN.

The first access method accommodates those WPANs for which no security or only secure communication is required and typically is an optional access mode during network deployment of the WPAN. In the second access method, the pre-shared session key is required between the device and the coordinator. However, the pre-shared session is not refreshable and thus prone to an attack, thus resulting in low security. For the third access method, each device for an access to the WPAN has to be authenticated with the WPAN administrator, thus resulting in considerable communication traffic and low efficiency; and moreover, any device may initiate a DoS attack by accessing the WPAN and acquiring a network address in an insecure mode, thus ending up with a failure of authentication with the WPAN administrator.

SUMMARY OF THE INVENTION

An object of the invention is to provide a wireless personal area network access method so as to address the technical problem of low security and efficiency of a wireless personal area network access method in the prior art.

A technical solution of the invention is as follows:

The invention provides a wireless personal area network access method including:

broadcasting, by a coordinator, a beacon frame comprising information on whether the coordinator requires an authentication and also comprising suites of authentication and key management supported by the coordinator when there is an authentication requirement of a device; and receiving, by the device, the beacon frame, and upon determining that the coordinator requires the authentication, performing authentication between the coordinator and the device in an authentication method corresponding to one of the suites of authentication and key management, and performing directly association between the coordinator and the device or performing firstly session key negotiation and then association between the coordinator and the device in response to an authentication result.

Wherein after receiving, by the device, the beacon frame and before performing authentication between the coordinator and the device, the method further includes:

selecting, by the device, one of the suites of authentication and key management supported by the coordinator, and transmitting information on the selected suite to the coordinator in an access request.

The method further includes:

performing, by the device, association between the coordinator and the device when determining that the coordinator does not require the authentication.

Performing directly association between the coordinator and the device or performing firstly session key negotiation and then association between the coordinator and the device in response to the authentication result includes:

when the authentication result is generation of a session key, performing directly association between the coordinator and the device using the session key; and when the authentication result is generation of a master key, determining a session key negotiation method, performing session key negotiation using the master key, and performing association between the coordinator and the device using a session key resulting from negotiation.

Associating the coordinator and the device includes:

generating, by the device, an association request, securing the association request using the session key, and transmitting the secured association request to the coordinator; and receiving, by the coordinator, the association request, desecuring the association request using the session key, verifying information in the association request, generating an association response from a verification result, securing the association response using the session key, and transmitting the secured association response to the device.

The authentication and the session key negotiation are performed based upon primitives or port control.

The invention has the following advantages:

1. The coordinator determines whether there is an authentication requirement of the device and transmits it to the device in a beacon frame, and if the coordinator does not require authentication of the device, an access of the device is enabled in the existing WPAN access method, thereby achieving good compatibility and improving extensibility of an access of the device to the WPAN; and if the coordinator requires authentication of the device, the coordinator performs authentication with the device, thereby preventing effectively a DoS attack and consequently improving security and efficiency of an access of the device to the WPAN.

2. During authentication between the coordinator and the device, negotiation about a suite of authentication and key management is performed in response to the broadcast beacon frame transmitted from the coordinator to the device and the access request returned from the device to the coordinator, and finally a session key is generated from the suite of authentication and key management resulting from negotiation so that the generated session key will be refreshed, thereby improving security of an access of the device to the WPAN.

3. When authentication and session key negotiation between the device and the coordinator is performed based upon primitives, authentication primitives and session key negotiation primitives are defined at the MAC layer for both the device and the coordinator, and authentication protocol data and session key negotiation protocol data is encapsulated in an authentication command frame and a session key negotiation command frame at the MAC layer for transmission, thereby improving the possibility of integrating an access of the device to the WPAN so that the authentication and session key negotiation processes can be integrated in hardware.

4. When authentication and session key negotiation between the device and the coordinator is performed based upon port control, uncontrolled and controlled ports are defined for both the device and the coordinator in a way that the controlled ports are disabled prior to successful association and the uncontrolled ports allow only passage of the authentication and session key negotiation protocol data and management information, thereby performing control on an access between the device and the coordinator to improve security of an access of the device to the WPAN.

DETAILED DESCRIPTION OF THE INVENTION

Figure 1:
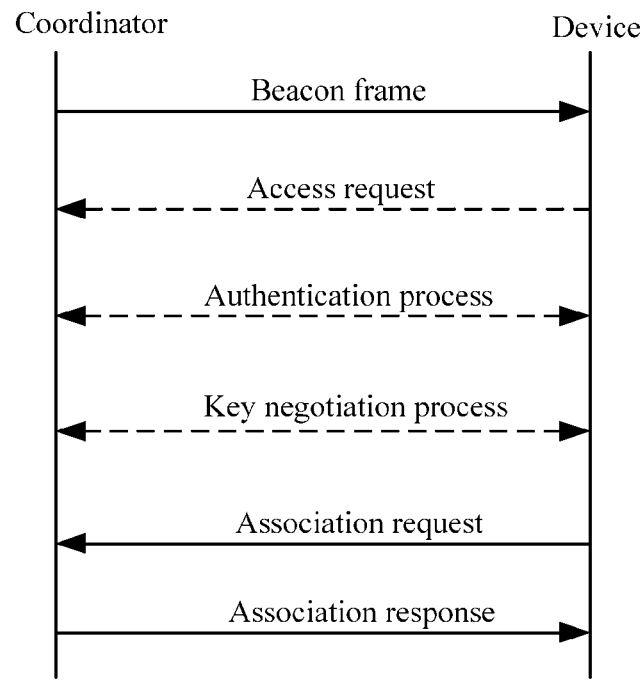
FIG. 1 is a signaling flow diagram between a coordinator and a device in an WPAN access method according to the invention.

In a WPAN access system, a device has an access to a WPAN through a coordinator in the WPAN, and the coordinator associated with the device decides whether to allow an access of the device to the WPAN in an access process, as illustrated in FIG. 1. The coordinator broadcasts a beacon frame, the device identifies from the beacon frame broadcasted by the coordinator a authentication requirement of the device required by the coordinator, and if the coordinator does not require the authentication requirement of the device, then the device performs directly an association process with the coordinator; otherwise, the devices selects one of suites of authentication and key management supported by the coordinator and transmits an access request to the coordinator. Then, the coordinator initiates authentication and session key negotiation processes between the coordinator and the device upon reception of the access request. The device and the coordinator will perform the association process only if the coordinator and the device authenticate each other and acquire a session key therebetween. Upon successful association, the device has an access to the WPAN through the coordinator for normal communication.

Figure 2:
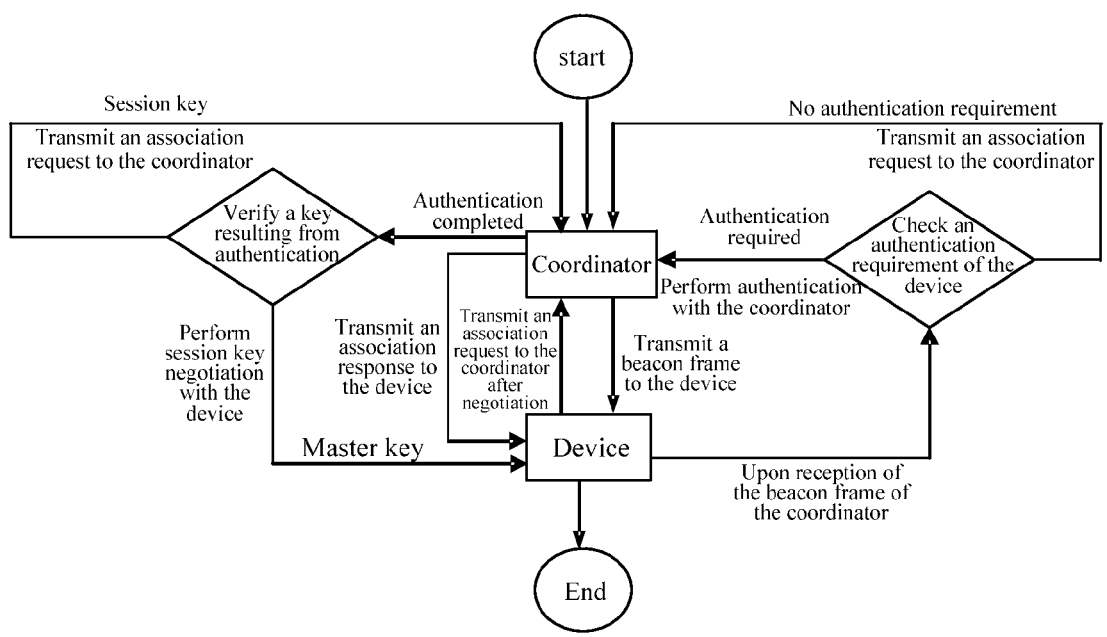
FIG. 2 is a schematic diagram of information interaction between the coordinator and the device in the WPAN access method according to the invention.
Figure 2A:
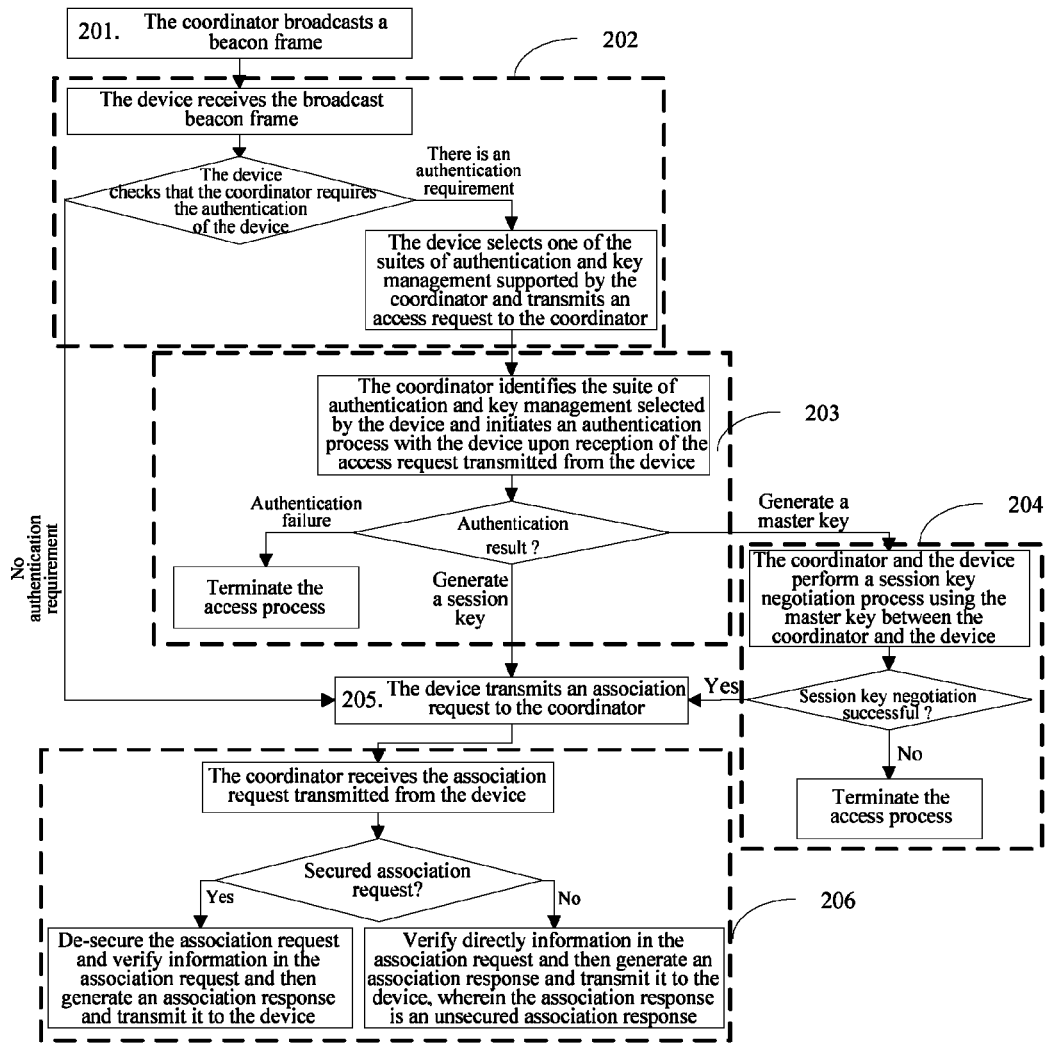
FIG. 2a is a schematic diagram of a flow of the WPAN access method according to the invention.

Referring to FIG. 1, an access method of the WPAN access system is performed particularly as follows. FIG. 2 and FIG. 2a are schematic diagrams of flow of the WPAN access system.

Step 201: The coordinator broadcasts a beacon frame. If the coordinator does not require authentication of the access device, then the coordinator indicates in the beacon frame that there is no authentication requirement of the device; otherwise, the coordinator indicates in the beacon frame that there is an authentication requirement of the device and at this time also suites of authentication and key management supported by the coordinator.

Step 202: The device firstly checks that the coordinator requires authentication of the device upon reception of the beacon frame transmitted by the coordinator in the step 201 and performs the step 205 if the coordinator does not require authentication of the device; and if the coordinator requires authentication of the device and the device also supports authentication, then the device selects one of the suites of authentication and key management supported by the coordinator and then transmits to the coordinator an access request including the selected suite of authentication and key management.

Particularly, when the coordinator supports only a suite of authentication and key management, the step of selecting, by the device, the suite of authentication and key management supported by the coordinator and transmitting an access request to the coordinator can be omitted. Correspondingly, the suite of authentication and key management used in the step 203 is the suite of authentication and key management supported by the coordinator.

Step 203: The coordinator firstly identifies the suite of authentication and key management selected by the device and then initiates an authentication process with the device upon reception of the access request transmitted by the device in the step 202.

When the authentication process is a primitive based authentication process, authentication primitives defined at the MAC layer for both the device and the coordinator are used to perform authentication between the device and the coordinator, and authentication protocol data is encapsulated in an authentication command frame at the MAC layer for transmission.

The primitive refers to a form in which a service is embodied, e.g., system invoking, a library function, etc. The service is an abstract concept for describing a relationship between adjacent layers, i.e., a set of operations with which each layer in the network provides an immediately upper layer. The lower layer is a service provider, and the upper layer is a user requesting for the service. The system invoking refers to a service primitive with which the kernel of an operating system provides a network application or an upper protocol. The $n^{th}$ layer in the network generally provides the $(n+1)^{th}$ layer with a more complete service than the $(n-1)^{th}$ layer, otherwise existence of the $n^{th}$ layer would be useless.

When the authentication process is a port control based authentication process, uncontrolled and controlled ports are defined for both the device and the coordinator, and data transmission primitives and port control at the MAC layer are used to perform authentication between the device and the coordinator, and authentication protocol data is encapsulated in a data frame at the MAC layer for transmission.

Particularly, the port refers to an abstract structure of software. Port based control can control input and output data. In a hierarchical network structure, there are strictly unidirectional dependences between respective layers, and assignment of tasks and cooperation between the respective layers are embodied at interfaces between the adjacent layers.

If authentication fails, then the access process is terminated; otherwise, when the coordinator and the device generate successfully a session key between the coordinator and the device in the access process, the flow goes to the step 205; or when the coordinator and the device generates successfully a master key between the coordinator and the device in the access process, the flow goes to the step 204.

Step 204: When the coordinator and the device generate successfully the master key between the coordinator and the device in the access process in the step 203, the coordinator and the device perform a session key negotiation process using the master key between the coordinator and the device.

When the session key negotiation process is a primitive based session key negotiation process, session key negotiation primitives defined at the MAC layer for both the device and the coordinator are used to perform session key negotiation between the device and the coordinator and session key negotiation protocol data is encapsulated in a session key negotiation command frame at the MAC layer for transmission. When the session key negotiation process is a port control based session key negotiation process, uncontrolled and controlled ports are defined for both the device and the coordinator, and data transmission primitives and port control at the MAC layer are used to perform session key negotiation between the device and the coordinator and session key negotiation protocol data is encapsulated in a data frame at the MAC layer for transmission.

If session key negotiation fails, then the access process is terminated; otherwise, the flow goes to the step 205.

Step 205: When the device knows in the step 202 that the coordinator does not require authentication of the device or when the device and the coordinator acquire successfully the session key between the device and the coordinator after the authentication and session key negotiation processes, the device transmits an association request to the coordinator. If a session key is present between the device and the coordinator, then the device protects the association request for security using the session key.

Step 206: The coordinator verifies whether the association request is a secured association request upon reception of the association request transmitted by the device in the step 205. If the association request transmitted by the device in the step 205 is a secured association request, then it de-secures the association request and verifies information in the association request and then generates an association response and transmits it to the device, wherein the association response is an association response secured using the session key between the device and the coordinator. Otherwise, it verifies directly the information in the association request and then generates an association response and transmits it to the device, wherein the association response is an unsecured association response. If the coordinator allows an access of the device to the WPAN, then the association response includes a network address allocated from the coordinator to the device, and the device has a successful access to the WPAN through the coordinator so that normal possible is possible between the device and the coordinator; otherwise, the association response includes a reason of failing to associate the device with the coordinator.

In an embodiment of the invention, when authentication and session key negotiation between the device and the coordinator is performed based upon primitives, authentication primitives and session key negotiation primitives are defined at the MAC layer for both the device and the coordinator, and authentication protocol data and session key negotiation protocol data is encapsulated in an authentication command frame and a session key negotiation command frame at the MAC layer to improve the possibility of integrating an access of the device to the WPAN so that the authentication and session key negotiation processes can be integrated in hardware.

When authentication and session key negotiation between the device and the coordinator is performed based upon port control, such an implementation is possible that uncontrolled and controlled ports are defined for both the device and the coordinator in a way that the controlled ports are disabled prior to successful association and the uncontrolled ports allow only passage of the authentication and session key negotiation protocol data and management information. Thus, it is possible to perform control on an access between the device and the coordinator while improving security of an access of the device to the WPAN.

The invention claimed is:

1. A wireless personal area network access method, comprising:

broadcasting, by a coordinator, a beacon frame comprising information on whether the coordinator requires an authentication and also comprising suites of authentication and key management supported by the coordinator when there is an authentication requirement of a device; and receiving, by the device, the beacon frame, and upon determining that the coordinator requires the authentication, performing the authentication between the coordinator and the device in an authentication method corresponding to one of the suites of authentication and key management, and performing directly association between the coordinator and the device or performing firstly session key negotiation and then association between the coordinator and the device in response to an authentication result, wherein performing directly association between the coordinator and the device or perform firstly session key negotiation and then association between the coordinator and the device in response to the authentication result comprises:

when the authentication result is generation of a session key, performing directly association between the coordinator and the device using the session key; and when the authentication result is generation of a master key, determining a session key negotiation method, performing session key negotiation using the master key, and performing association between the coordinator and the device using a session key resulting from negotiation.

2. The method according to claim 1, further comprising:
after receiving, by the device, the beacon frame and before performing authentication between the coordinator and the device,
selecting, by the device, one of the suites of authentication and key management supported by the coordinator, and transmitting information on the selected suite to the coordinator in an access request.

3. The method according to claim 2, further comprising:
performing, by the device, association between the coordinator and the device when determining that the coordinator does not require the authentication.

4. The method according to claim 3, wherein performing association between the coordinator and the device comprises:
generating, by the device, an association request, securing the association request using the session key, and transmitting the secured association request to the coordinator; and receiving, by the coordinator, the association request, de-securing the association request using the session key, verifying information in the association request, generating an association response from a verification result, securing the association response using the session key, and transmitting the secured association response to the device.

5. The method according to claim 3, wherein the authentication and the session key negotiation are performed based upon primitives or port control.

6. The method according to claim 2, wherein performing association between the coordinator and the device comprises:
generating, by the device, an association request, securing the association request using the session key, and transmitting the secured association request to the coordinator; and receiving, by the coordinator, the association request, de-securing the association request using the session key, verifying information in the association request, generating an association response from a verification result, securing the association response using the session key, and transmitting the secured association response to the device.

7. The method according to claim 2, wherein the authentication and the session key negotiation are performed based upon primitives or port control.

8. The method according to claim 1, wherein performing association between the coordinator and the device comprises:
generating, by the device, an association request, securing the association request using the session key, and transmitting the secured association request to the coordinator; and receiving, by the coordinator, the association request, de-securing the association request using the session key, verifying information in the association request, generating an association response from a verification result, securing the association response using the session key, and transmitting the secured association response to the device.

9. The method according to claim 1, wherein the authentication and the session key negotiation are performed based upon primitives or port control.

\* \* \* \* \*